(12) United States Patent
Tollefsrud et al.

(10) Patent No.: US 10,570,797 B2
(45) Date of Patent: Feb. 25, 2020

(54) EXHAUST AFTER-TREATMENT SYSTEM WITH IMPROVED DEF PURGE CYCLING IN AGRICULTURAL VEHICLES

(71) Applicant: CNH Industrial America LLC, New Holland, PA (US)

(72) Inventors: Aaron Tollefsrud, Willmar, MN (US); Richard Kerner, Sunbug, MN (US)

(73) Assignee: CNH Industrial America LLC, New Holland, PA (US)

( * ) Notice: Subject to any disclaimer, the term of this patent is extended or adjusted under 35 U.S.C. 154(b) by 58 days.

(21) Appl. No.: 15/863,032

(22) Filed: Jan. 5, 2018

(65) Prior Publication Data

US 2019/0211726 A1   Jul. 11, 2019

(51) Int. Cl.
  *F01N 3/20* (2006.01)
  *B01D 53/94* (2006.01)

(52) U.S. Cl.
  CPC ......... *F01N 3/208* (2013.01); *B01D 53/9418* (2013.01); *B01D 53/9431* (2013.01); *B01D 53/9495* (2013.01); *B01D 2251/2067* (2013.01); *B01D 2259/124* (2013.01); *F01N 2610/02* (2013.01); *F01N 2610/1473* (2013.01); *F01N 2610/1493* (2013.01); *F01N 2900/08* (2013.01); *F01N 2900/1808* (2013.01)

(58) Field of Classification Search
  CPC combination set(s) only.
  See application file for complete search history.

(56) References Cited

U.S. PATENT DOCUMENTS

| 8,079,211 | B2 | 12/2011 | Levin et al. |
| 8,132,405 | B2 * | 3/2012 | Katou ............ B01D 53/9409 60/295 |
| 8,387,366 | B2 * | 3/2013 | Ohno ............... F01N 3/2066 60/274 |
| 8,661,785 | B2 | 3/2014 | Levin et al. |
| 8,671,664 | B2 | 3/2014 | Garcia et al. |
| 8,881,507 | B2 * | 11/2014 | Yan ................. F01N 3/2066 60/286 |
| 8,931,259 | B2 | 1/2015 | Yan et al. |

(Continued)

FOREIGN PATENT DOCUMENTS

| WO | 2015188329 | 12/2015 |
| WO | 2016068878 | 5/2016 |
| WO | 2016144692 | 9/2016 |

*Primary Examiner* — Binh Q Tran
(74) *Attorney, Agent, or Firm* — Rebecca L. Henkel; Rickard K. DeMille

(57) ABSTRACT

An exhaust after-treatment system has a DEF system with improved DEF purge cycling during which time DEF is returned to a DEF storage tank. The DEF system adapts its methodology based on a condition within the DEF system. A purge valve may be arranged in a doser feed line between a DEF supply module and a DEF doser module. A purging control system may be configured to control the purge valve based on detected states within the DEF system, such as a detected state that corresponds to a plugged DEF doser module. If a plugged doser module is detected, the purge valve may be opened to vent the doser module feed line to atmosphere which allows the DEF to be returned to the DEF storage tank without creating a siphon effect that could draw additional DEF from the DEF storage tank into the supply module.

17 Claims, 3 Drawing Sheets

(56) References Cited

U.S. PATENT DOCUMENTS

| | | |
|---|---|---|
| 9,221,014 B2 | 12/2015 | Butzke |
| 9,255,511 B2 * | 2/2016 | Watanabe ............... F01N 3/208 |
| 9,267,411 B2 | 2/2016 | Cruz |
| 9,605,574 B2 * | 3/2017 | Nihongi ................ F01N 3/2066 |
| 2007/0240405 A1 * | 10/2007 | Nishina .................. B01D 53/90 60/286 |
| 2010/0071349 A1 * | 3/2010 | Kitazawa .............. F01N 3/2066 60/277 |
| 2013/0032214 A1 | 2/2013 | Saby et al. |
| 2014/0331650 A1 | 11/2014 | Yang et al. |
| 2015/0101313 A1 | 4/2015 | Mitchell et al. |
| 2015/0104363 A1 | 4/2015 | Singh et al. |
| 2015/0252712 A1 | 9/2015 | Foster et al. |
| 2016/0040575 A1 | 2/2016 | Zhang et al. |

\* cited by examiner

EXHAUST AFTER-TREATMENT SYSTEM WITH IMPROVED DEF PURGE CYCLING IN AGRICULTURAL VEHICLES

FIELD OF THE INVENTION

The invention relates generally to agricultural vehicles with exhaust after-treatment systems and, in particular, to an exhaust after-treatment system with improved DEF purge cycling.

BACKGROUND OF THE INVENTION

Exhaust after-treatment systems are needed for many diesel engines to comply with emissions requirements. After-treatment systems such as those needed for Tier 4b and Tier 4f emission regulations include various subsystems and components. The subsystems and components may include particulate reduction systems such as DOC (diesel oxidation catalyst) units and DPF (diesel particulate filter) units as well as NOx (nitrogen oxides) reduction systems such as SCR (selective catalytic reduction) units. SCR units reduce emission of NOx emissions by using ammonia to convert NOx into nitrogen and water within the SCR unit. Since concentrated ammonia can be caustic and hazardous, it is not stored in ammonia form or directly introduced as ammonia into the SCR units. Instead, urea-based DEF (diesel exhaust fluid) is introduced into or near the SCR units and its urea is converted into the ammonia that reacts with the NOx, industry standards require DEF to include about 32.5% urea and about 67.5% deionized water, which can freeze at about 12° F. A high temperature is required to convert the urea to ammonia by vaporizing the water in the DEF and thermally decomposing the urea to form the ammonia that reacts with the NOx to convert it to nitrogen and water, in order to accommodate the needed high temperatures while avoiding freezing problems in cold environments, some DEF systems include dosing systems with doser modules that inject DEF into hot exhaust airflows in the exhaust system, for example, directly upstream of the SCR units and have purging systems that remove DEF from delivery system components during purge cycles and return it to a DEF storage tank to reduce the likelihood of breakage of the components by the expansion of freezing DEF. Components of the delivery system include a supply module that receives DEF from the DEF storage tank and delivers DEF to a doser module. The doser module is an electronically operated module that injects the DEF into the exhaust system. If the doser module injects DEF at too low of an exhaust temperature, not only will the urea fail to convert to ammonia, but the DEF can crystallize on the doser module injection ports causing the doser module to plug. When the doser module plugs, the DEF system purge cycle can allow DEF to be pulled back into the supply module instead of leaving it empty. That is because, when the doser module is plugged, a suction applied to the supply module in order to remove DEF from it and the doser module can establish a siphon in the supply module feed line, which draws additional DEF from the DEF storage tank and reintroduces it into the supply module. In cold environments, the DEF that was inadvertently reintroduced into the supply module by siphoning during the purge cycle can freeze and expand, which can break the supply module.

SUMMARY OF THE INVENTION

An exhaust after-treatment system has a DEF system with improved DEF purge cycling for agricultural vehicles. The exhaust after-treatment system is able to complete a DEF system purge cycle to return DEF to a DEF storage tank regardless of the condition of a DEF doser module. A purge valve is arranged in a doser feed line, and pressure within a supply module is monitored for controlling the purge valve to ensure full purging of DEF from the system.

According to one aspect of the invention, the DEF system adapts its methodology based on a condition within the DEF system. A purge valve may be arranged in a doser feed line between a DEF supply module and a DEF doser module. A purging control system may be configured to control the purge valve based on detected states within the DEF system, such as a detected state that corresponds to a plugged DEF doser module. Pressure in the DEF system, such as at the supply module, may be monitored as an indicator of a plugged or unplugged condition of the doser module. If a plugged doser module is detected, then the purge valve may be opened to vent the doser module feed line to atmosphere which allows the DEF to be removed from the supply module, supply module feed line, and doser module feed line without creating a siphon effect that could draw additional DEF from the DEF storage tank into the supply module.

According to one aspect of the invention, the DEF system may include a DEF storage system, a DEF delivery system, a DEF purge system, and a DEF control system. The DEF storage system may include a DEF storage tank. The DEF delivery system may include a supply module to receive DEF from the DEF storage tank through a supply module feed line. The supply module delivers DEF to a doser module through a doser module feed line and the doser module selectively delivers DEF controlled amounts of DEF into the exhaust system based on the detected NOx levels in the exhaust system. The doser module may inject the DEF into a mixer tube of the exhaust system upstream of an SCR (selective catalytic reduction) unit in which turbulence is induced to promote mixing of the DEE with the exhaust gasses flowing through it. The DEF purge system is configured to evacuate DEF from the feed lines and the supply and doser modules and return the DEF to the DEF storage tank. A DEF control system is configured to control the functions of the DEF system and may be incorporated into the engine's ECU (engine control unit). The DEF control system can detect when the doser module is plugged. When the doser module is plugged, the DEF control system commands a venting of the doser module feed line to atmosphere to allow the feed lines to be evacuated even though the doser module is plugged.

According to another aspect of the invention, the DEF control system uses signals from a supply module pressure sensor and control logic to monitor the purge cycle or purge process and control the purge valve operation based on pressure feedback to ensure DEF evacuation from the feed lines.

According to another aspect of the invention, a method is provided for treating exhaust from an internal combustion engine such as a diesel engine of an agricultural vehicle. The method includes monitoring NOx (nitrogen oxides) levels in an exhaust system downstream of a diesel engine while the engine is running. DEF (diesel exhaust fluid) is delivered into the exhaust system through a DEF delivery system. The DEF delivery system has a doser module that directs the DEF into the exhaust system based on detected values of the NOx levels. The engine is turned off and a DEF purge cycle is initiated. The DEF purge cycle includes detecting a plugged or unplugged condition of the doser module. If an unplugged condition of the doser module is detected, then a vacuum pressure is applied to the DEF delivery system to withdraw DEF from the DEF delivery system and direct the withdrawn DEF to a DEF storage system. If a plugged condition of the doser module is detected, then the DEF system is vented upstream of the doser module, and vacuum pressure is applied to the DEF delivery system to withdraw DEF from the DEF delivery system and direct the withdrawn DEF to a DEF storage system.

According to another aspect of invention, during the purge cycle, the vacuum pressure is applied to a doser module feed line to remove DEF from the doser module and its feed line and a supply module feed line to remove DEF from a supply module that delivers DEF to the doser module and the supply module's feed line.

According to another aspect of the invention, a DEF purge system includes a vacuum source that applies the vacuum pressure to the DEF delivery system. A pressure within the DEF system, such as at a DEF supply module, is monitored as the indicator of the plugged condition of the doser module or the unplugged condition of the doser module.

According to another aspect of invention, the monitored pressure within the DEF purge system is evaluated, and a value below a low pressure threshold value indicates a plugged condition of doser module injection ports and therefor a plugged doser module, whereas a value above the lower pressure threshold value indicates un-plugged doser module injection ports and thus an unplugged doser module. The lower pressure threshold value may be a value of about −250 hPa (hectopascal) or within a range of about −250 hPa to −300 hPa.

According to another aspect of invention, if a plugged condition of the doser module is detected, then the doser module feed line may be vented to atmosphere. The DEF purge system may include an electronically-actuated purge valve that is arranged in the doser module feed line. Purge valve is configured to selectively vent the doser module feed line to atmosphere. The purge valve may be electronically actuated and normally closed so that energizing the purge valve vents the doser module feed line to atmosphere. If the doser module is plugged so that the purge valve vents the doser module feed line to atmosphere while the pressures below the low pressure threshold value, when the DEF is removed from the doser module feed line and the supply module feed line during the purge cycle, the pressure will rise above the low pressure threshold value, whereby the pressure sensor detects a "high" value indicating that the feed lines have been successfully evacuated of DEF and the purge valve can be closed. The purge cycle can end at this time.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
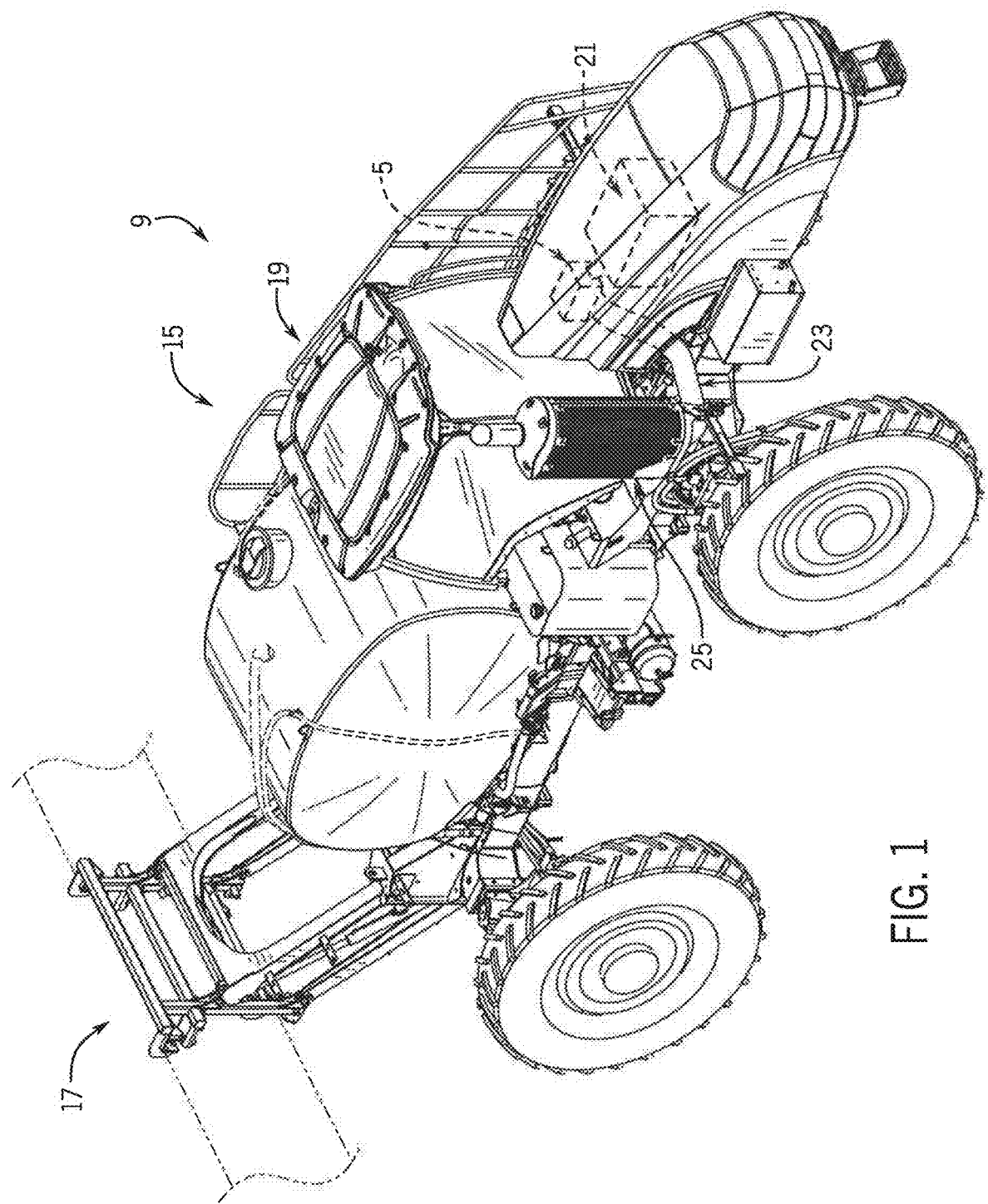
FIG. 1 is a pictorial view of an off-road agricultural vehicle with an exhaust after-treatment system with an improved DEF purge cycle according to the present invention.

Referring now to the drawings and specifically to FIG. 1, an exhaust after-treatment system 5 with improved DEF (diesel exhaust fluid) purge cycle is shown used with off-road agricultural vehicle 9. Off-road agricultural vehicle 9 is represented as an applicator 15, shown here as a rear-boom self-propelled agricultural applicator or sprayer vehicle, such as those available from CASE IH, such as the Trident™ Series Combination applicator and Patriot® Series sprayers. Although applicator 15 is shown as a rear-boom self-propelled sprayer, it is understood that applicator 15 can instead be configured as a dry product spreader with a dry box or spinner box for broadcast-type delivery of dry product. Furthermore, applicator 15 can instead be a front-boom sprayer, such as those available from CNH Industrial, including the Miller Nitro and New Holland Guardian Series front-boom sprayers. It is further understood that off-road agricultural vehicle 9 may include other self-propelled implements, tractors, or other off-road agricultural vehicles 9.

Referring again to FIG. 1, applicator 15 includes a chassis with a frame that supports various assemblies, systems, and components. These various assemblies, systems, and components may include boom system 17, cab 19, and an engine 21 housed under a hood in an engine compartment. In mechanical drive applications, a mechanical transmission receives power from engine 21 and delivers power for rotating wheels by way of power-transmitting driveline components such as drive shafts, differentials, and other gear sets in portal, drop boxes, or other housings. For hydraulic drive systems, a hydraulic system receives power from engine 21 and may include at least one hydraulic pump as part of a hydrostat arrangement for providing hydraulic pressure for operating hydraulic components within the hydraulic system, including hydraulic motors that are operably connected to the hydraulic pump(s) for rotating the wheels.

Still referring to FIG. 1, exhaust after-treatment system 5 is incorporated in an exhaust system 23 that directs engine exhaust gasses from engine 21 to the ambient, including PM (particulate matter) and NOx (nitrogen oxides). The exhaust after-treatment system 5 is configured to reduce non-desired emissions from the exhaust gasses and may include various components such as various ones of a DOC (diesel oxidation catalyst) unit, a DRT (decomposition reactor) unit, and an SCR (selective catalytic reduction) unit 25, which is shown here as a muffler-type SCR unit 25.

Figure 2:
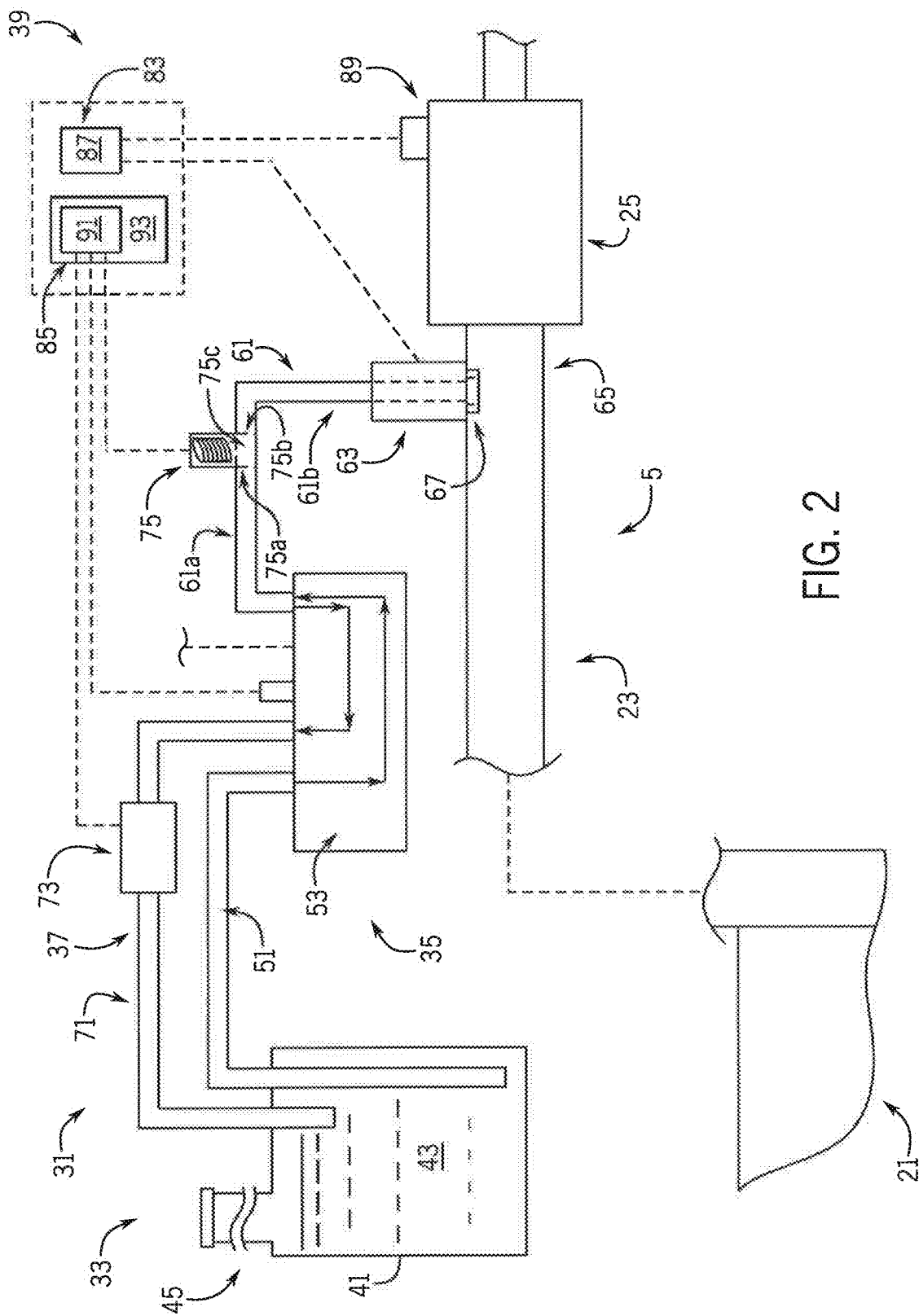
FIG. 2 is a simplified partially schematic representation of the exhaust after-treatment system of FIG. 1.

Referring now to FIG. 2, DEF system 31 is configured to introduce urea-based DEF such as AdBlue® DEF is introduced into the exhaust system 23 for reducing NOx levels. DEF system 31 includes DEF storage system 33, DEF delivery system 35, DEF purge system 37, and DEF control system 39.

Still referring to FIG. 2, DEF storage system 33 has a DEF storage tank 41 that stores DEF 43. Storage tank 41 has a fill spout 45 through which a user can pour DEF 47 for filling the storage tank 41, and it can also receive evacuated or purged DEF 43 from purge system 37.

Still referring to FIG. 2, DEF delivery system 35 is configured to convey DEF 43 out of DEF storage system 33 and inject it into exhaust gasses flowing through exhaust system 23. DEF delivery system 35 includes a supply module feed line 51 that extends between the storage tank 41 and a DEF supply module 53. Supply module 53 may have an internal pump that draws DEF out of storage tank 41, through the supply module feed line 51, to deliver the DEF in a downstream direction through a doser module feed line 61 to doser module 63. Doser module 63 injects the DEF 43 into an injection pipe segment shown here as mixer tube 65 of exhaust system 23. Mixer tube 65 is shown here upstream of SCR unit 25 and may include turbulence-inducing units such as vanes or fins that promote mixing and vaporization of the DEF within the hot exhaust gasses flowing through exhaust system 23. Although doser module 63 is shown mounted in mixing tube 65, it is understood that doser module 63 may be arranged to inject DEF 43 directly into SCR unit 25 or some other component of exhaust aftertreatment system 5. Regardless of the particular location of doser module 63 within exhaust after-treatment system 5, the doser module 63 may be configured to selectively inject DEF 43 as discrete injection events to mix with the exhaust gasses in amounts determined based on detected NOx levels. Doser module 63 has injection ports 67 from which the DEF 43 passes out of doser module 63 and into mixing tube 65.

Still referring to FIG. 2, DEF purge system 37 is configured to purge or remove DEF 43 from at least some of the DEF delivery system 35 components and return it to the DEF storage system 33 reducing, for example, the likelihood of freezing and damaging the DEF those components of the DEF delivery system 35 during exposure to temperatures that are cold enough to freeze DEF. DEF purge system 37 includes a DEF return line 71 that extends from supply module 53 to storage tank 41. Purge pump 73 is arranged to apply pressure for moving the DEF 43 through the return line 71 toward storage tank 41. Purge pump 73 is shown here as an in-line pump with an inlet or suction side that applies vacuum pressure to the segment of return line 71 between purge pump 73 and supply module 53, and an outlet or positive pressure side delivers DEF 43 out of the purge pump 73 under positive pressure toward storage tank 41. Evacuating DEF 43 from supply module 53 correspondingly evacuates DEF 43 out of downstream components, such as the doser module feed line 61 and doser module 63.

Still referring to FIG. 2, purge system 37 includes a purge valve 75 that is arranged to selectively vent the doser module feed line 61 to atmosphere. This may provide a vacuum break if injection ports 67 and therefore the doser module 63 is plugged. Correspondingly, even when doser module 63 is plugged, venting the doser module feed line 61 to atmosphere by controlling purge valve 75 allows DEF 43 to be removed from the DEF delivery system 35 without creating a siphon effect that could draw additional DEF out of storage tank 41 and into supply module 53, while trying to purge DEF from the DEF delivery system 35. Purge valve 75 may be a multi-position, multi-way valve such as a two-position three-way valve that is arranged within the doser module feed line 61, shown here between first and second doser module feed line segments 61a, 61b. Purge valve 75 may be configured to be normally closed so that when the purge valve 75 is in a resting or default state, it defines a first position as a closed position and can be actuated to an open or vented second position that vents the doser module feed line 61. Purge valve 75 is stable in its closed position an may have an operating pressure of, for example, about 9 Bar of a biasing force that holds it shut in the closed position. Purge valve 75 may be an electronically actuated valve with a spool or other valve mechanism that can be actuated between the closed and opened positions so that, when de-energized, the purge valve 75 is closed and the doser module feed line 61 is not vented and, when the purge valve 75 is energized, the feed line is vented to the atmosphere.

Still referring to FIG. 2, purge valve 75 is shown here with three ports, including first and second feed line ports 75a, 75b that respectively connect to the first and second doser module feed line segments 61a, 61b. First feed line port 75a receives DEF from a downstream end of the first doser module feed line segment 61a as a DEF inlet of the purge valve 75. Second feed line port 75b delivers DEF into an upstream end of the second doser module feed line segment 61b as a DEF outlet of the purge valve 75. A third port is shown as a vent port 75c of purge valve 75 that can be selectively opened or closed by, for example, electrical actuation of the purge valve 75. When vent port 75c is actuated to the closed position, the doser module feed line 61 is closed to atmosphere while permitting flow through the first and second doser module feed line segments 61a, 61b and purge valve 75. The doser module feed line 61 permits flow through the first and second doser module feed line segments 61a, 61b and purge valve 75 until the fluid 43 has been extracted from the second doser module feed line segment 61b. At this point, vent port 75c is actuated to the open or vented position, allowing the first doser module feed line segment 61a to be vented to atmosphere. The purge valve 75 can be configured and controlled to remain in the closed position until fluid is pulled back past the purge valve 75 so that only at this time, with the fluid pulled past the purge vale 75 and the second doser module feel line segment 61b fully purged, does the purge valve 75 open/vent to atmosphere. This may be done in a manner that vents only the first doser module feed line segment 61a to atmosphere when the second doser module feed line segment 61b has been purged and without ever venting the second doser module feed line segment 61b, itself, to atmosphere. Energizing and de-energizing the purge valve to actuating it between its open and closed positions is controlled by DEF control system 81.

Still referring to FIG. 2, DEF control system 81 is configured to control various components of DEF system 31 and is shown here including DEF dosing control system 83 and purge control system 85. DEF control system 81 includes at least one controller and power supply, such as an industrial computer or, e.g., a programmable logic controller (PLC), along with corresponding software and suitable memory for storing such software and hardware, including interconnecting conductors for power and signal transmission for controlling respective electronic, electro-mechanical, hydraulic, and pneumatic components that may be in the exhaust after-treatment system 5.

Still referring to FIG. 2, although schematically represented as arranged near each other, dosing control system 83 and purge control system 85 may be housed separately from each other. Dosing control system 83 may include its own dosing controller or dosing control unit 87 that may be housed in the DEF supply module 53. The dosing control unit 87 is configured to command delivery of DEF through the doser module 63, as well as control characteristics of the delivery such as how much is delivered by, for example, pulse width modulation of the injection device of the doser module 63 or other delivery control based on the configuration of doser module 63, which may be based on NOx levels detected by NOx sensor 89.

Still referring to FIG. 2, a purge control system 85 may include its own purging control unit 91 that can be a stand-alone unit, incorporated in the dosing control unit 87, or, as shown here, incorporated into the ECU (engine control unit) 93 whereby the ECU 93 defines the purging control unit 91, itself, and has corresponding control logic stored in the ECU 93 memory for implementation through the ECU 93. Purging control unit 91 controls the DEF purge system 37 based on a condition within the DEF system, such as a plugged doser module 63. Control system 85, such as through purging control unit 91, may recognize a plugged doser module 63 based on a signal from supply module pressure sensor 95.

Figure 3:
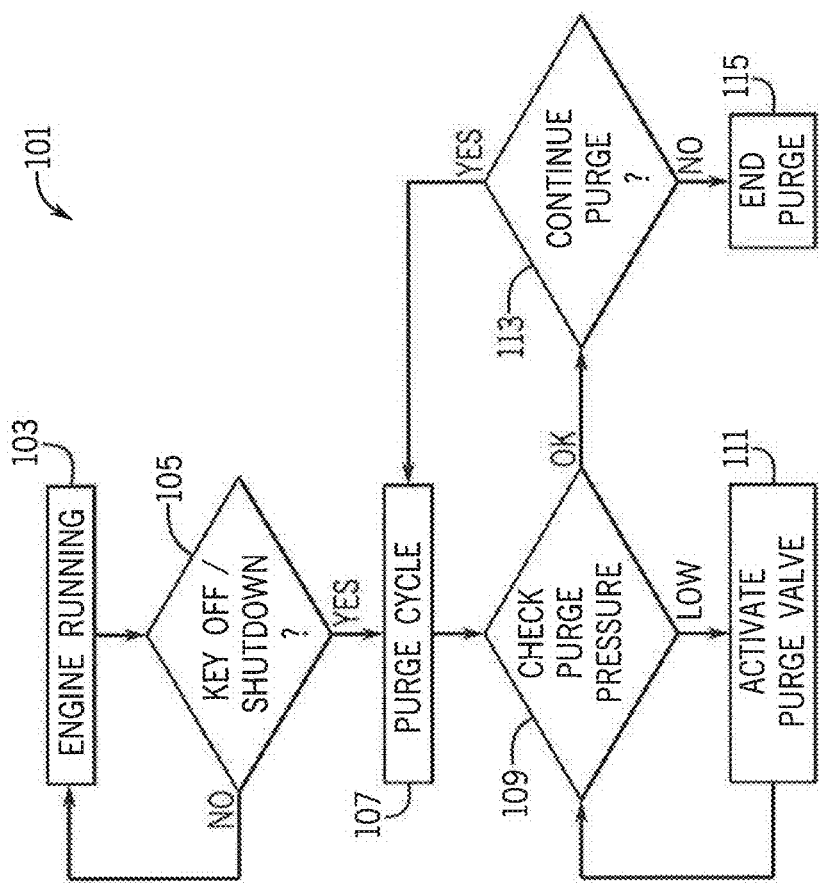
FIG. 3 is a flow diagram of a method of using the exhaust after-treatment system of FIG. 1.

Referring now to FIG. 3, with background reference to FIG. 2 for illustrating components and systems, one exemplary method 101 is represented in the flow diagram. Block 103 represents operation of the off-road agricultural vehicle 9 (FIG. 1), with its engine 21 running. At this time, by way of dosing control system 83, DEF control system 81 monitors NOx levels and, if needed, injects DEF 43 into exhaust system 23. DEF control system 81 monitors whether the engine 21 remains running or a key off or engine shutdown occurred, as represented at block 105. Upon a key off condition after the off-road agricultural vehicle 9 has been running, by way of purge control system 85, DEF control system 81 initiates a DEF purge cycle, as represented at block 107. This may include the ECU 93 as the purging control unit 91 initiating a purge cycle by, for example, activating purge pump 73 to evacuate DEF from the supply module feed line 51, supply module 53, doser module feed line 61, and doser module 63 through DEF return line 71. While doing this, the DEF control system 81 monitors pressure within the DEF system 31 to determine whether the doser module 63 is plugged, which may be done by the purging control unit 91. As show, purging control unit 91 may be incorporated into or defined by the ECU 93, which may check purge pressure as represented at block 109 by, for example, evaluating a signal(s) from supply module pressure sensor 95. A detected pressure value below a low pressure threshold value at the supply module 53 indicates a plugged condition of the doser module injection ports 67 and correspondingly a plugged doser module 63. The lower pressure threshold value may be a value of about −250 hPa (hectopascal) or within a range of about −250 hPa to −300 hPa. When the detected pressure value is below the low pressure threshold value, the purging control unit 91 commands the purge valve 75 to vent the doser module feed line 61 to atmosphere. This may be done by the purging control unit 91 sending a command signal to activate or energize the purge valve 75 to electronically actuate it to an open or vented position that vents the doser module feed line 61 to atmosphere, as represented at block 111. The purge cycle and purge pressure checks continue at least periodically. Again at block 109, a detected pressure value above the lower pressure threshold value at the supply module 53 indicates un-plugged doser module injection ports 67 and thus an unplugged doser module 63. The purging control unit 91 determines whether purging should continue, as represented at block 113. This may be done by a timer or by further monitoring the pressure within the dose module 63, for example, by sensing a high enough pressure to indicate successful DEF evacuation from the various lines and/or other components of the DEF system 31, at which point the purge cycle may end as indicated at block 115.

Many changes and modifications could be made to the invention without departing from the spirit thereof. The scope of these changes will become apparent from the appended claims.

We claim:

1. An exhaust after-treatment system with improved DEF (diesel exhaust fluid) purge cycling for an agricultural vehicle, the exhaust after-treatment system comprising:
   an SCR (selective catalytic reduction) unit;
   a DEF (diesel exhaust fluid) system configured to deliver DEF upstream of the SCR unit for reacting with NOx (nitrogen oxides) to reduce NOx emissions, the DEF system including,
      a DEF storage tank for storing the DEF used by the DEF system;
      a supply module operatively connected to the DEF storage tank and configured to withdraw DEF out of the DEF storage tank and deliver the DEF in a downstream direction;
      a doser module configured to receive DEF from the supply module and selectively deliver the DEF upstream of at least a portion of the SCR unit; and
      a DEF purge system for removing DEF from at least one of the supply module and the doser module as purged DEF during a purge cycle and return the purged DEF to the DEF storage tank, the DEF purge system including a purge valve having an upstream end interconnected to the supply module and a downstream end interconnected to the doser module and being configured to vent to atmosphere when the DEF doser module is plugged to allow removal of DEF from the DEF supply module; and
   wherein the DEF purge system is configured to detect a pressure within the DEF system indicative of a plugged condition of the DEF doser module and to control the purge cycle based on the plugged condition of the DEF doser module.

2. The exhaust after-treatment system of claim 1, further comprising,
   a supply module feed line that extends from the DEF storage tank to the DEF supply module for delivering DEF from the DEF storage tank to the DEF supply module;
   a doser module feed line that extends from the supply module to the DEF doser module for delivering DEF from the DEF supply module to the DEF doser module; and
   wherein the purge valve is arranged in the doser module feed line.

3. The exhaust after-treatment system of claim 2, wherein the purge valve is an electronically actuated valve.

4. The exhaust after-treatment system of claim 3, wherein the purge valve is normally closed so that energizing the purge valve opens the purge valve and vents the doser module feed line to atmosphere.

5. The exhaust after-treatment system of claim 1, wherein the detected pressure within the DEF system indicative of a plugged condition of the DEF doser module is a pressure value that is below a low pressure threshold value.

6. The exhaust after-treatment system of claim 5, wherein the low pressure threshold value is about −250 hPa (hectopascal).

7. The exhaust after-treatment system of claim 6, wherein the DEF purge system is configured to detect a pressure within the supply module and evaluate whether the doser module is plugged based on the pressure within the supply module.

8. The exhaust after-treatment system of claim 1, further comprising a pressure sensor arranged to detect a pressure as a detected pressure that corresponds to a pressure within the supply module, and
wherein the DEF system evaluates the detected pressure and, if the detected pressure is a value that is below a low pressure threshold value, venting the DEF system downstream of the supply module.

9. The exhaust after-treatment system of claim 1, further comprising a pressure sensor arranged to detect a pressure as a detected pressure that corresponds to a pressure within the supply module, and
wherein the DEF system evaluates the detected pressure and, if the detected pressure is a value that is below a low pressure threshold value, the exhaust after-treatment system vents the DEF system downstream of the supply module.

10. A method of treating exhaust from an internal combustion engine of an agricultural vehicle, the method comprising:
monitoring NOx (nitrogen oxides) levels in an exhaust system downstream of a diesel engine while the engine is running;
delivering DEF (diesel exhaust fluid) into the exhaust system through a DEF delivery system having a supply module operatively connected to a DEF storage tank and configured to withdraw DEF out of the DEF storage tank and deliver the DEF in a downstream direction and a doser module configured to receive DEF from the supply module and direct the DEF into the exhaust system based on detected values of the NOx levels;
turning the engine off;
initiating a DEF purge cycle, with the DEF purge cycle including:
detecting a plugged or unplugged condition of the doser module, wherein,
if an unplugged condition of the doser module is detected,
applying a vacuum pressure to the DEF delivery system to withdraw DEF from the DEF delivery system and direct the withdrawn DEF to a DEF storage system; and
if a plugged condition of the doser module is detected,
opening a purge valve having an upstream end interconnected to the supply module and a downstream end interconnected to the doser module so as to vent the DEF system upstream of the doser module to atmosphere, and
applying a vacuum pressure to the DEF delivery system to withdraw DEF from the DEF delivery system and direct the withdrawn DEF to a DEF storage system.

11. The method of claim 10, wherein a vacuum source of a DEF purge system applies the vacuum pressure to the DEF delivery system and the method further includes,
monitoring a pressure within the DEF system as an indicator of the plugged condition of the doser module or the unplugged condition of the doser module.

12. The method of claim 11, further comprising:
applying the vacuum pressure to:
a doser module feed line that delivers DEF to the doser module;
a supply module feed line that delivers DEF to a supply module that withdraws DEF from a DEF storage tank in the DEF storage system and delivers the DEF to the doser module; and
monitoring a pressure within the DEF purge system as an indicator of the plugged condition of the doser module or the unplugged condition of the doser module.

13. The method of claim 12, further comprising:
evaluating the monitored pressure within the DEF purge system, wherein:
a pressure value below a low pressure threshold value indicates a plugged condition of the doser module.

14. The method of claim 13, wherein the lower pressure threshold value is a value of about −250 hPa (hectopascal).

15. The method of claim 13, further comprising,
evaluating a pressure within the supply module as an indicator of the plugged condition or unplugged condition of the doser module.

16. The method of claim 15, wherein the purge valve is an electronically actuated purge valve arranged in the doser module feed line for selectively venting the doser module feed line to atmosphere, and the method further comprises:
energizing the purge valve while the pressure value is below the low pressure threshold value to vent the doser module feed line to atmosphere.

17. The method of claim 16, further comprising:
de-energizing the purge valve while the pressure value is above the low pressure threshold value to provide an unvented condition of the doser module feed line.

* * * * *